United States Patent
Latal et al.

[11] Patent Number: 5,875,522
[45] Date of Patent: Mar. 2, 1999

[54] GROMMET AND ADJUSTABLE STRAP FASTENER ASSEMBLY

[75] Inventors: James F. Latal, Palatine; Dave G. Kotowski, Round Lake Beach, both of Ill.

[73] Assignee: Illinois Tool Works Inc., Glenview, Ill.

[21] Appl. No.: 707,008

[22] Filed: Sep. 3, 1996

[51] Int. Cl.[6] .......................... B65D 63/00; B65D 63/10; B65H 75/14
[52] U.S. Cl. ...................... 24/16 PB; 24/453; 242/608.3
[58] Field of Search .............................. 242/608.3, 609.1; 24/16 PB, 16 R, 17 AP, 17 B, 30.5 R, 30.5 P, 30.5 L, 453, 114.5

[56] References Cited

U.S. PATENT DOCUMENTS

| | | | |
|---|---|---|---|
| 4,345,724 | 8/1982 | Lindell | 242/608.3 X |
| 4,389,754 | 6/1983 | Sohma | 24/16 PB |
| 4,665,588 | 5/1987 | Nakano | 24/16 PB |
| 4,768,741 | 9/1988 | Logsdon | 24/16 PB X |
| 4,862,560 | 9/1989 | Lichtenberg | 24/16 PB |
| 5,004,179 | 4/1991 | Salloum | 242/608.3 X |
| 5,388,311 | 2/1995 | Solbeck | 24/453 X |
| 5,443,155 | 8/1995 | Robinson | 24/16 PB X |
| 5,448,809 | 9/1995 | Kraus | 24/453 |
| 5,544,391 | 8/1996 | Hoffman | 24/16 PB |

OTHER PUBLICATIONS

Panduit, Cable Tie Sales Brochure p. No. 241.
Arden Fasteners, Cable Tie Installation Tool Sales Brochure, p. No. 252.

*Primary Examiner*—Peter M. Cuomo
*Assistant Examiner*—Robert J. Sandy
*Attorney, Agent, or Firm*—Schwartz & Weinrieb

[57] ABSTRACT

A grommet and adjustable strap fastener assembly including an elongate strap member having a head portion at a first end in combination with at least one body member having a first strap aperture for receiving the elongate strap member. A retention member protruding into the first strap aperture of the body member permits adjustable passage of the elongate strap member through the first strap aperture in a first direction. The retention member prevents passage of the elongate strap member through the first strap aperture in a second direction opposite the first direction. According to another aspect of the invention, the body member includes a second strap aperture disposed in a recess wherein the head portion of the elongate strap member is disposable in the recess of the body member when the elongate strap member is disposed through the second strap aperture. In one application, one or more fastener assemblies retain a tubular core member between first and second spool flanges each disposed on opposing sides of the tubular core member to form a spool assembly usable for packaging coiled materials including coiled copper tubing.

20 Claims, 2 Drawing Sheets

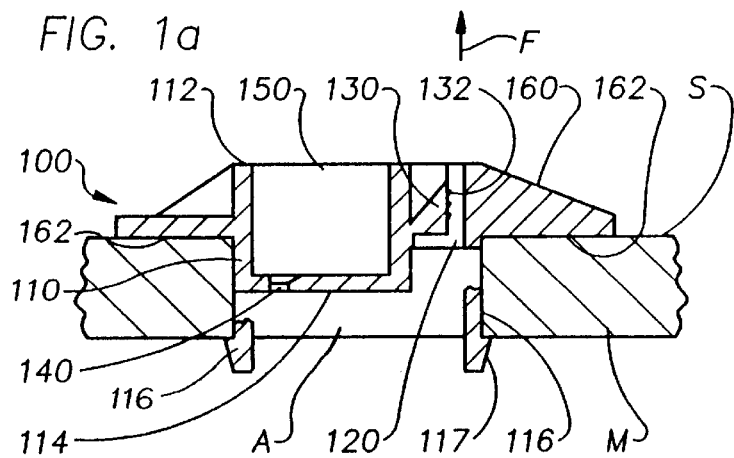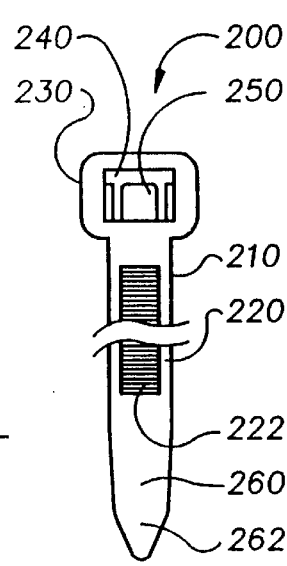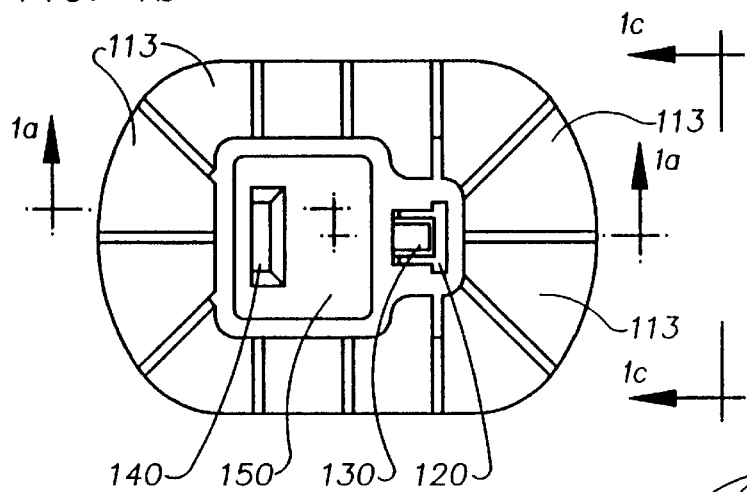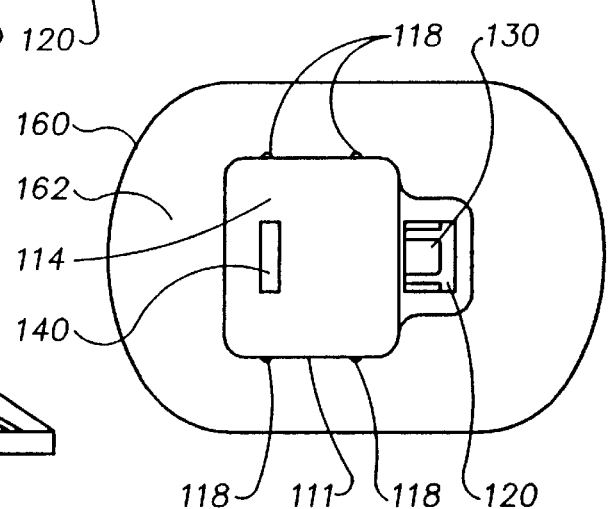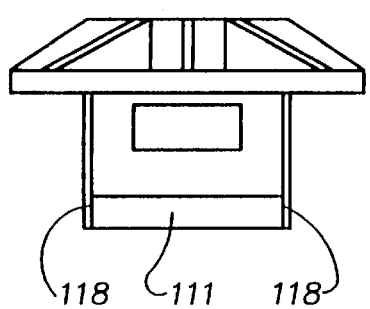

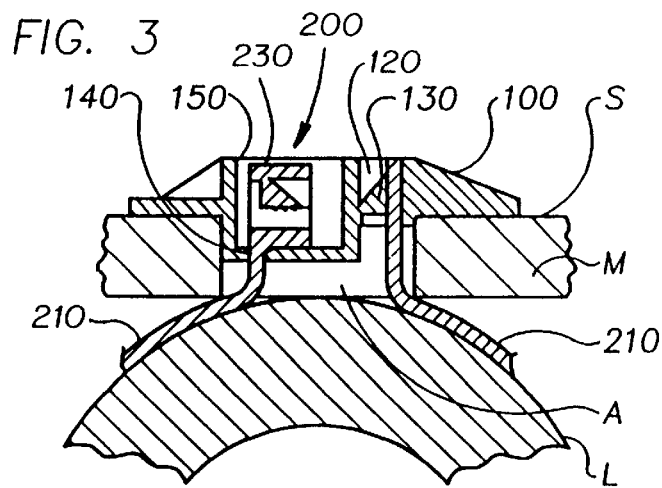
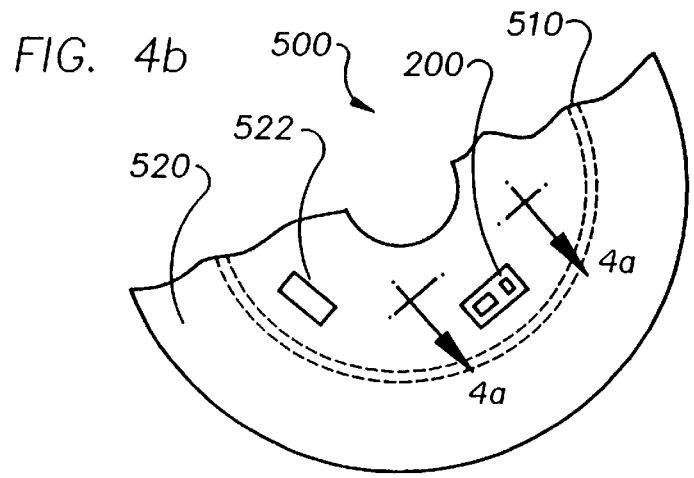
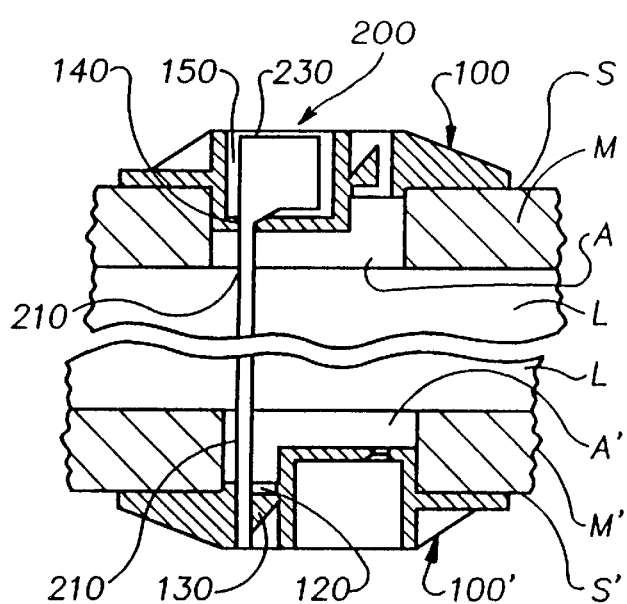

GROMMET AND ADJUSTABLE STRAP FASTENER ASSEMBLY

FIELD OF THE INVENTION

The invention relates generally to fastener assemblies, and more particularly to fastener assemblies including one or more grommet and adjustable straps useable for retaining a tubular core between disk shaped flanges to form a spool assembly about which coiled materials including coiled copper tubing is packaged.

BACKGROUND OF THE INVENTION

Adjustable strap type fastening members have many useful applications including the bundling of cables, conduits and other loads. A well known and commonly used article for this purpose is a unitary nylon cable tie having an elongate flexible strap portion and an enlarged head portion with an aperture and a retention member protruding into the aperture. A tip of the elongate strap portion is disposable through the aperture of the head portion to form a loop, and the retention member permits one-way passage of the strap therethrough, wherein the loop is usually tightened about a load disposed within the loop. Some applications require that the cable tie be fastened to a mounting member, and for these applications it is known to configure the head portion of the cable tie with an aperture for receiving a mounting bolt, or to configure the head portion of the cable tie with a barbed member disposable in an aperture of the mounting member.

Other applications require the retention of a load between separate mounting members, but this type of retention is not typically performed by cable ties. In the copper tubing industry, for example, it is known to package pre-coiled copper tubing about a spool assembly made from a corrugated cardboard material assembled during the packaging process. More specifically, pre-coiled copper tubing is disposed about a tubular core having a bottom end fastened on a first disk shaped flange. After the coiled copper tubing is disposed about the tubular core, a second disk shaped flange is fastened on the opposing top side of the tubular core. The tubular core includes a plurality of fingers, or tangs, protruding from its opposing top and bottom sides. During assembly, each finger on the tubular core is disposed through a corresponding slot in the first and second disk shaped flanges. The fingers are then folded over and secured to the disk shaped flanges with staples. The end portions of the fingers are folded again and disposed in a second corresponding slot in the disk shaped flanges. The spool assembly process, however, is performed manually and is extremely laborious since each tang must be aligned with a corresponding slot and inserted therethrough before fastening with staples. The cardboard spools, moreover, have a tendency to deteriorate during shipping and handling, particularly the tangs, which tend to tear along the folds and separate from the staples.

The inventors of the present invention recognize that many fastening applications and the assembly and fastening of spool assemblies including cardboard spool assemblies useable for packaging coiled copper tubing may be performed more effectively with a novel grommet and adjustable strap fastener assembly than with prior art cable ties and fasteners.

OBJECTS OF THE INVENTION

It is therefore an object of the invention to provide a novel fastener assembly that overcomes problems in the prior art.

It is also an object of the invention to provide a novel grommet and strap fastener assembly that is economical and relatively easy to apply.

It is another object of the invention to provide a novel grommet and strap fastener assembly including at least one grommet and an adjustable strap wherein the strap is retainable in a strap aperture through the grommet by a retention member protruding into the strap aperture.

It is yet another object of the invention to provide a novel grommet and strap fastener assembly including a grommet that is mountable on a mounting member.

It is a further object of the invention to provide a novel grommet and strap fastener assembly usable for retaining a tubular core between opposing flange members to form a spool useable for packaging coiled materials including copper tubing.

SUMMARY OF THE INVENTION

The present invention is, accordingly, drawn to a grommet and adjustable strap fastener assembly comprising an elongate strap member, which may be rigid or flexible, having a head portion at a first end in combination with at least one separate body member having a first strap aperture for receiving the elongate strap member. A retention member protruding into the first strap aperture of the body member permits adjustable passage of the elongate strap member through the first strap aperture in a first direction. The retention member prevents passage of the elongate strap member through the first strap aperture in a second direction opposite the first direction. In an alternative configuration, the body member includes a second strap aperture disposed in a recess in the body member wherein the head portion of the elongate strap member is disposable in the recess when the elongate strap member is disposed through the second strap aperture.

According to another aspect of the invention, the grommet of the fastener assembly is mountable on a mounting surface of a mounting member. In one application, one or more fastener assemblies retain a tubular core member between first and second spool flanges each disposed on opposite sides of the tubular core member so as to form a spool assembly usable for packaging coiled materials including copper tubing. In one retention configuration, the fastener assembly of the present invention includes a grommet disposed on sides of corresponding spool flanges, and at least one elongate strap member disposable through an aperture of the first spool flange, through the interior of the tubular core member, and through an aperture of the second spool flange, wherein the elongate strap member is fastened to the opposing grommets under tension to retain the tubular core member between the first and second spool flanges.

BRIEF DESCRIPTION OF THE DRAWINGS

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators throughout the several views, and wherein:

FIG. 1a is a partial sectional view of a grommet, taken along lines 1a—1a of FIG. 1b, usable with a grommet and strap fastener assembly according to an exemplary embodiment of the invention.

FIG. 1b is a top view of a grommet usable with a grommet and strap fastener assembly according to an exemplary embodiment of the invention.

FIG. 1c is an end view of the grommet taken along lines 1c—1c of FIG. 1b.

FIG. 1d is a bottom view of a grommet usable with a grommet and strap fastener assembly according to an exemplary embodiment of the invention.

FIG. 2 is a side view of a strap usable with a grommet and strap fastener assembly according to an exemplary embodiment of the invention.

FIG. 3 is a partial sectional view of a grommet and adjustable strap fastener assembly according to an exemplary embodiment and application of the invention.

FIG. 4a is a partial sectional view of a grommet and adjustable strap fastener assembly according to another exemplary embodiment and application of the invention, which is illustrative of a view taken along lines 4a—4a of FIG. 4b.

FIG. 4b is a partial plan view of grommet and adjustable strap fastener assembly in combination with a spool assembly usable for packaging coiled materials including coiled copper tubing.

DETAILED DESCRIPTION OF THE INVENTION

The grommet and adjustable strap fastener assembly of the present invention comprises generally at least one grommet connectable with a strap to form the fastener assembly, and more generally one or more grommets connectable with one or more straps to form a fastener assembly. FIGS. 1a–1d illustrate various related views of a grommet 100 having several features usable with the fastener assembly of the present invention, and FIG. 2 illustrates a strap 200 having several features usable with the fastener assembly of the present invention.

According to one aspect of the invention, the grommet 100 comprises a body member 110 having a first strap aperture 120 with a retention member 130 protruding into the first strap aperture 120, and the strap 200 comprises an elongate strap member 210 with a strap engagement surface 220. The elongate strap member 210 is disposable in the first strap aperture 120 of the grommet 100 wherein the retention member 130 is engageable with the strap engagement surface 220. The retention member 130 permits adjustable feeding or passage of the strap 200 through the first strap aperture 120 in a first direction F, and the retention member 130 prevents passage of the strap 200 through the first strap aperture 120 in a second direction opposite the first direction F. The elongate strap member 210 therefore may be irreversibly fed or passed through the first strap aperture 120 in the first direction F to secure a load as further discussed below.

In one embodiment, the retention member 130 is a resilient ratcheting member biased to constrict or reduce the first strap aperture 120 wherein the resilient member 130 is also flexible against its bias to enlarge the constricted first strap aperture 120. The resilient ratcheting member 130 is accordingly biased toward an elongated strap member 130 210 disposed in the first strap aperture 120 wherein the ratcheting member is engageable with the strap engagement surface 220 so as to prevent passage of the strap 200 in the second direction through the first strap aperture 120. The resilient ratcheting member 130 is also flexible away from the strap 200 disposed in the first strap aperture 120 when the strap 200 is fed in the first direction F through the first strap aperture 120 wherein the resilient ratcheting member 130 is disengagable from the strap engagement surface 220 so as to permit passage of the strap 200 in the first direction F.

In the exemplary embodiment of the invention, the strap engagement surface 220 includes a plurality of serrations 222, and the retention member 130 includes one or more barbs or teeth 132 biased into engagement with the serrations 222 of the strap 200 disposed in the first strap aperture 120. The serrations 222 are engaged by the barbs or teeth 132 so as to prevent passage or feeding of the strap 200 in the second direction through the first strap aperture 120, but the barbs or teeth 132 permit adjustable feeding or passage of the strap 200 in the first direction F through the first strap aperture 120.

According to another aspect of the invention, the grommet body member 110 comprises a second strap aperture 140 disposed in a recess 150 in a first end portion 112 of the body member 110, and the strap 200 includes an enlarged head portion 230 coupled to the elongate strap member 210. The elongate strap member 210 is disposable through the second strap aperture 140 and the head portion 230 of the strap 200 is disposable in the recess 150 of the grommet body member 110. The recess 150 is preferably configured so that the head portion 230 of the strap 200 does not form a discontinuous protrusion from the first side portion 112 of the grommet 100. The grommet 100 may include either one or both the first strap aperture 120 and retention member 130 and the second strap aperture 140 depending on the requirements of the particular application as discussed further below.

According to another aspect of the invention, the grommet body member 110 comprises a flange portion 160 extending outwardly from the first end portion 112 and having a surface 162 mountable on a mounting surface S of a mounting member M. In an alternative configuration, however, a second end portion 114 of the body member 110 is mountable on the mounting surface S of the mounting member M in the absence of the flange portion. The first side portion 112 of the grommet body member 110 of the exemplary embodiment includes a bevelled surface to reduce any discontinuity resulting from the presence of the grommet 100 mounted on the surface S of the mounting member M.

According to yet another aspect of the invention, the body member 110 comprises a retaining member for securing the grommet body member 110 in an aperture A of the mounting member M. In the exemplary configuration of FIG. 1a, the retaining member is one or more resilient legs 116, shown in part, extending from the second side portion 114 of the body member 110 and including an outwardly protruding flange 117 for engaging the mounting member M. In the exemplary embodiment of FIGS. 1c and 1d, the retaining member is one or more longitudinal ridges or ribs 118 protruding from outer side portions 111 of the body member 110 for frictionally engaging surfaces defining the aperture A in the mounting member M, although an arrangement of one or more annular ribs may alternatively be disposed about the outer side portion 111. In yet another embodiment, outer side portions 111 of the body member 110 frictionally engage the surfaces defining the aperture A of the grommet body member 110 in the absence of the ribs 118. The body retaining member may, more generally, include combinations of one or more of the exemplary embodiments discussed above.

According to the exemplary embodiment of FIG. 1a, the grommet 100 is a unitary member formed preferably of a moldable plastic material including nylon. The grommet 100 of the exemplary embodiment is configured for molding in a two-part mold, which is particularly economical. In alternative embodiments, however, the grommet 100 may be formed of other materials including composites and metals formed in other processes including a casting process. The grommet 100 may also be an assembly of separate components formed of one or more different materials. FIG. 1b shows a plurality of recesses 113, which are readily moldable, or cast, or otherwise formed on the first end portion 112 of the grommet 100 to reduce raw material usage and reduce weight without loss of structural integrity.

According to the exemplary embodiment of FIG. 2, the strap 200 is also a unitary member formed preferably of a plastic material including nylon. A strap 200 having an elongate strap member 210 with a strap engagement surface 220, a head portion 230, and other features suitable for use with the grommet 100 and adjustable strap fastener assembly of the present invention is a cable tie of the type commercially available from Panduit, Chicago, Ill. FIG. 2 illustrates a cable tie including a cable strap aperture 240 having a retention member 250 protruding into the aperture 240, which operates to retain the strap in substantially the same manner as the retention member 130 of the grommet 100 discussed above. The strap 200 also includes generally an end portion 260 with a tapered tip 262 to facilitate insertion of the elongate strap member 210 into a strap aperture.

According to the exemplary application and embodiment of the grommet and adjustable strap fastener assembly of FIG. 3, a portion of a grommet 200 is disposed in an aperture A and supported on a mounting surface S of a mounting member M as discussed above. An elongate strap member 210 of a strap 200 is disposed through the second strap aperture 140 of the grommet 100 and the head portion 230 of the strap 200 is disposed in the strap recess 150 of the grommet 100. The elongate strap member 210 is looped about a load L, and an end portion of the elongate strap member 210 is adjustably disposed and retained in the first strap aperture 120 by the retention member 130 as discussed above to retain the load L.

In an alternative application and embodiment of the grommet and adjustable strap fastener assembly of the invention, which is a variation on the exemplary embodiment of FIG. 3, first and second separate grommets 100 are disposed in corresponding separate apertures A and supported on a mounting surface S of a common mounting member M, and a common strap 200 is coupled to the first and second grommets 100 to form the fastener assembly. According to this alternative application and embodiment, the elongate strap member 210 of the strap 200 is disposed through the second strap aperture 140 of the first grommet 100 and the head portion 230 of the strap 200 is disposed in the strap recess 150 of the first grommet 100, and the end portion of the elongate strap member 210 is adjustably disposed through and retained in the first strap aperture 120 of the first grommet 100 as discussed above to retain the load L.

In yet another alternative application and embodiment of the grommet and adjustable strap fastener assembly of the invention, which is also a variation on the exemplary embodiment of FIG. 3, the elongate strap member 210 of the strap 200 is disposed through a strap aperture, not shown, in the mounting member M wherein the head portion 230 of the strap is supported directly on the mounting surface S of the mounting member M without a grommet. Some applications may require that the strap 200 have an enlarged head portion 230 including possibly a bevelled surface to maintain a degree of continuity with the mounting surface S of the mounting member M. A portion of the elongate strap member 210 is adjustably disposed through and retained in the first strap aperture 120 of a grommet 100 disposed in another aperture of the mounting member M as discussed above to support the load L.

According to the exemplary application and embodiment of the grommet and adjustable strap fastener assembly of FIG. 4a, first and second separate grommets 100, 100' are disposed in corresponding apertures A, A' and supported on corresponding mounting surfaces S, S' of corresponding mounting members M, M' separated by a load L, which is retained between the mounting members M, M'. An elongate strap member 210 of the strap 200 is disposed through the second strap aperture 140 of the first grommet 100 and the head portion 230 of the strap 200 is disposed in the strap recess 150 of the first grommet 100. The end portion of the same elongate strap member 210 is adjustably disposed through and retained in the first strap aperture 120 of the second grommet 100' as discussed above to retain the load L between the first and second mounting members M, M'. In an alternative configuration, a second strap, not shown, is disposed between the first and second grommets 100, 100' substantially parallel to the first strap for additional retention strength. More generally, a plurality of fastener assemblies including two grommets 100 and at least one strap 200 are useable to retain the load L between the mounting members M, M'. In an alternative application and fastener assembly configuration, the head portion 230 of the strap 200 is supported directly on the mounting surface S of one of the mounting members M in the absence of a grommet.

FIG. 4b is plan view of a spool assembly 500 of the type usable for packaging coiled articles including coiled copper tubing. The spool 500 includes a tubular core member 510 and first and second spool flanges 520 each disposed and retained on opposite sides of the tubular core member 510 by one or more grommet and adjustable strap fastener assemblies of the present invention. FIG. 4a is illustrative of a partial sectional view taken along lines 4a—4a of FIG. 4b wherein the flanges 520 correspond to the mounting members M, M', and the tubular core 510 corresponds to the load L. The grommets are disposed over, and may be partially disposed in, corresponding apertures 522 in the spool flanges 520 wherein the aperture in each flange is aligned with a corresponding aperture in the opposite spool flange 520. FIG. 4b shows the apertures located interiorly of the tubular core member 510 so as to prevent interference with the coiled material on the tubular core 510. One or more straps 200 interconnecting the opposite pairs of grommets retain the tubular core between flanges 510. More generally, a plurality of grommet and strap fastener assemblies are arranged, preferably symmetrically, about the spool 500 so as to securely retain the tubular core 510 between the spool flanges 520. In one embodiment, the spool flanges 520 each include a circular score on one side thereof for concentrically aligning and positioning the flanges 520 relative to the tubular core 510 before application of the fastener assembly or assemblies.

In some applications, depending on the configuration of strap 200, the grommet 100 is configured so that the retention member 130 protrudes into an opposite side of the first aperture 120, relative to the side shown in the exemplary embodiments, or alternatively so that the second strap aperture 140 is located on an opposite side of the recess 150, so as to properly align or orient the engagement surface 220 of the elongate strap member 210 for engagement by the retention member 130.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A grommet and adjustable strap fastener assembly, comprising:

an elongate strap member having a head portion at one end thereof; and a grommet body member having a recess within which said head portion of said elongate strap member is disposed, a strap aperture for receiving said elongate strap member, and a retention member protruding into said strap aperture and engagable with a portion of said elongate strap member when said portion of said elongate strap member is disposed through said strap aperture so as to permit adjustable passage of said elongate strap member through said strap aperture in a first direction, and for preventing passage of said elongate strap member through said strap aperture in a second direction opposite said first direction.

2. The fastener assembly of claim 1, wherein:

said grommet body member has a second strap aperture defined within a wall portion of said grommet body member which defines said recess for passage therethrough of said elongate strap member when said head portion of said elongate strap member is disposed within said recess of said grommet body member.

3. The fastener assembly of claim 1, wherein:

said elongate strap member comprises an engagement surface having serrations thereon; and said retention member is a resilient ratcheting member which is flexible so as to be movable away from said elongate strap member and thereby permit passage of said elongate strap member through said strap aperture in said first direction, but wherein said resilient ratcheting member is biased toward and engagable with said serrations of said elongate strap member so as to prevent passage of said elongate strap member through said strap aperture in said second direction.

4. The fastener assembly of claim 1, wherein:

said grommet body member comprises a flange portion extending radially outwardly from an end portion of said body member and defining a mounting surface so as to enable mounting of said grommet body member upon a mounting surface of a mounting member.

5. The fastener assembly of claim 4, wherein:

said grommet body member has at least one ridge member protruding from an outer side wall portion of said grommet body member for engaging side wall portions of a mounting member which define an aperture within a mounting member within which said grommet body member is disposed when said flange portion of said grommet body member has said mounting surface mounted upon a mounting surface of a mounting member.

6. The fastener assembly as set forth in claim 3, wherein:

said retention member comprises a plurality of barbed teeth for engagement with said serrations disposed upon said engagement surface of said elongate strap member.

7. The fastener assembly as set forth in claim 4, wherein:

said flange portion of said grommet body member is defined upon a first end portion of said grommet body member such that said mounting surface of said flange portion can engage a first surface of a mounting member upon which said grommet body member is to be mounted; and said grommet body member further comprises resilient snap-engagement leg means upon a second end portion of said grommet body member for engaging a second surface of a mounting member upon which said grommet body is to be mounted.

8. A grommet and adjustable strap fastener assembly, in combination with a spool assembly usable for receiving coil materials, comprising:

a tubular core member having an interior portion;

first and second spool flanges disposed upon opposite sides of said tubular core member, said first and second spool flanges having apertures which are alignable with each other when said first and second spool flanges are disposed upon opposite sides of said tubular core member;

an elongate strap member having a head portion at one end of said elongate strap member and disposed in contact with one of said first and second spool flanges when said elongate strap member is disposed through said aperture of said first spool flange, through said interior portion of said tubular core member, and through said aperture of said second spool flange; and a grommet body member disposed in contact with the other one of said first and second spool flanges and having a strap aperture for receiving said elongate strap member when said elongate strap member is disposed through said aperture of said first spool flange, through said interior portion of said tubular core member, and through said aperture of said second spool flange, and a retention member protruding into said strap aperture and engagable with a portion of said elongate strap member when said portion of said elongate strap member is disposed through said strap aperture so as to permit adjustable passage of said elongate strap member through said strap aperture in a first direction, and for preventing passage of said elongate strap member through said strap aperture in a second direction opposite said first direction whereby said elongate strap member is able to be tensioned between said first and second spool flanges so as to retain said tubular core member between said first and second spool flanges.

9. The combination of claim 8, further comprising:

a second grommet body member disposed in contact with said one of said first and second spool flanges, having a strap aperture defined therein for receiving said elongate strap member, and having a recess defined therein within which said head portion of said elongate strap member is disposed when said elongate strap member is inserted through said strap aperture of said second grommet body member such that said second grommet body member is interposed between said head portion of said elongate strap member and said one of first and second spool flanges such that said head portion of said elongate strap member is in indirect contact with said one of said first and second spool flanges through means of said second grommet body member.

10. The combination of claim 8, wherein:

said grommet body member has at least one ridge member protruding from an outer side wall portion of said grommet body member for engaging side wall portions of said other one of said first and second spool flanges which define said aperture within said other one of said first and second spool flanges so as to frictionally retain said grommet body member within said aperture of said other one of said first and second spool flanges.

11. The combination of claim 8, wherein:

said elongate strap member comprises an engagement surface having serrations thereon; and said retention member comprises a resilient ratcheting member which is engageable with said serrations of said engagement surface of said elongate strap member for preventing passage of said elongate strap member through said strap aperture of said grommet body member in said second direction, and which is disengageable from said serrations of said engagement surface of said elongate strap member for permitting adjustable passage of said elongate strap member through said strap aperture of said grommet body member in said first direction.

12. The combination of claim 9, wherein:

each one of said grommet and second grommet body members has a portion thereof disposed within a respective one of said apertures of said first and second spool flanges, and a flange portion extending radially outwardly from an end portion of a respective one of each one of said grommet and second grommet body members so as to define a mounting surface for each one of said grommet and second grommet body members whereby each one of said grommet and second grommet body members is able to be mounted upon a mounting surface of a respective one of said first and second spool flanges when said portions of said grommet and second grommet body members are disposed within said apertures of said first and second spool flanges.

13. The combination as set forth in claim 9, further comprising:

a second elongate strap member having a head portion at one end of said second elongate strap member;

a second strap aperture defined within said second grommet body member for receiving said second elongate strap member when said second elongate strap member is inserted through said aperture of said second spool flange, through said interior portion of said tubular core member, and through said aperture of said first spool flange; and a retention member protruding into said second strap aperture of said second grommet body member and engageable with a portion of said second elongate strap member when said portion of said second elongate strap member is disposed within said second strap aperture of said second grommet body member so as to permit adjustable passage of said second elongate strap member through said second strap aperture of said second grommet body member in a first direction, and for preventing passage of said second elongate strap member through said second strap aperture of said second grommet body member in a second direction opposite said first direction whereby said second elongate strap member is able to be tensioned between said first and second spool flanges so as to retain said tubular core member between said first and second spool flanges; and a recess defined within said grommet body member within which said head portion of said second elongate strap member is disposed, and a second strap aperture defined within said grommet body member for receiving said second elongate strap member therethrough when said second elongate strap member is inserted through said aperture of said second spool flange, through said interior portion of said tubular core member, and through said aperture of said first spool flange.

14. The combination of claim 11, wherein:

said retention member comprises a plurality of barbed teeth for engagement with said serrations disposed upon said engagement surface of said elongate strap member.

15. A grommet and adjustable strap fastener assembly, in combination with a load assembly, comprising:

a load member having a passageway defined therethrough;

first and second mounting members disposed upon opposite sides of said load member, said first and second mounting members having apertures which are alignable with each other when said first and second mounting members are disposed upon said opposite sides of said load member;

an elongate strap member having a head portion at one end of said elongate strap member and disposed in contact with one of said first and second mounting members when said elongate strap member is disposed through said aperture of said first mounting member, through said passageway of said load member, and through said aperture of said second mounting member; and a grommet body member disposed in contact with the other one of said first and second mounting members and having a strap aperture for receiving said elongate strap member when said elongate strap member is disposed through said aperture of said first mounting member, through said passageway of said load member, and through said aperture of said second mounting member, and a retention member protruding into said strap aperture and engageable with a portion of said elongate strap member when said portion of said elongate strap member is disposed through said strap aperture so as to permit adjustable passage of said elongate strap member through said strap aperture in a first direction, and for preventing passage of said elongate strap member through said strap aperture in a second direction opposite said first direction whereby said elongate strap member is able to be tensioned between said first and second mounting members so as to retain said load member between said first and second mounting members.

16. The combination as set forth in claim 15, further comprising:

a second grommet body member disposed in contact with said one of said first and second mounting members, having a strap aperture defined therein for receiving said elongate strap member, and having a recess defined therein within which said head portion of said elongate strap member is disposed when said elongate strap member is inserted through said strap aperture of said second grommet body member such that said second grommet body member is interposed between said head portion of said elongate strap member and said one of said first and second mounting members such that said head portion of said elongate strap member is in indirect contact with said one of said first and second mounting members through means of said second grommet body member.

17. The combination as set forth in claim 16, wherein:

each one of said grommet and second grommet body members has a portion thereof disposed within a respective one of said apertures of said first and second mounting members, and a flange portion extending radially outwardly from an end portion of a respective one of each one of said grommet and second grommet body members so as to define a mounting surface for each one of said grommet and second grommet body members whereby each one of said grommet and second grommet body members is able to be mounted upon a mounting surface of a respective one of said first and second mounting members when said portions of said grommet and second grommet body members are disposed within said apertures of said first and second mounting members.

18. The combination as set forth in claim 15, wherein:

said elongate strap member comprises an engagement surface having serrations thereon; and said retention member comprises a resilient ratcheting member which is engageable with said serrations of said engagement surface of said elongate strap member for preventing passage of said elongate strap member through said strap aperture of said grommet body member in said second direction, and which is disengageable from said serrations of said engagement surface of said elongate strap member for permitting adjustable passage of said elongate strap member through said strap aperture of said grommet body member in said first direction.

19. The combination as set forth in claim 18, wherein:

said retention member comprises a plurality of barbed teeth for engagement with said serrations disposed upon said engagement surface of said elongate strap member.

20. The combination as set forth in claim 16, further comprising:

a second elongate strap member having a head portion at one end of said second elongate strap member;

a second strap aperture defined within said second grommet body member for receiving said second elongate strap member when said second elongate strap member is inserted through said aperture of said second mounting member, through said passageway of said load member, and through said aperture of said first mounting member; and a retention member protruding into said second strap aperture of said second grommet body member and engageable with a portion of said second elongate strap member when said portion of said second elongate strap member is disposed within said second strap aperture of said second grommet body member so as to permit adjustable passage of said second elongate strap member through said second strap aperture of said second grommet body member in a first direction, and for preventing passage of said second elongate strap member through said second strap aperture of said second grommet body member in a second direction opposite said first direction whereby said second elongate strap member is able to be tensioned between said first and second mounting members so as to retain said load member between said first and second mounting members; and a recess defined within said grommet body member within which said head portion of said second elongate strap member is disposed, and a second strap aperture defined within said grommet body member for receiving said second elongate strap member therethrough when said second elongate strap member is inserted through said aperture of said second mounting member, through said passageway of said load member, and through said aperture of said first mounting member.

\* \* \* \* \*